United States Patent
Gokyu et al.

(10) Patent No.: US 8,849,500 B2
(45) Date of Patent: Sep. 30, 2014

(54) SYSTEM FOR PREDICTING TIRE CASING LIFE

(71) Applicant: Bridgestone Corporation, Tokyo (JP)

(72) Inventors: Syunsuke Gokyu, Kodaira (JP); Takashi Tomomoto, Kodaira (JP); Kenjiro Yanai, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 14/015,555

(22) Filed: Aug. 30, 2013

(65) Prior Publication Data

US 2014/0067193 A1    Mar. 6, 2014

(30) Foreign Application Priority Data

Sep. 3, 2012 (JP) ................................ 2012-193142

(51) Int. Cl.
| | |
|---|---|
| *G01M 17/02* | (2006.01) |
| *B60C 99/00* | (2006.01) |
| *B60C 23/04* | (2006.01) |
| *B60C 11/24* | (2006.01) |
| *G07C 5/00* | (2006.01) |

(52) U.S. Cl.
CPC ............. *G01M 17/02* (2013.01); *B60C 99/006* (2013.01); *B60C 23/0408* (2013.01); *B60C 11/246* (2013.01); *G07C 5/008* (2013.01)
USPC ......... 701/31.9; 156/64; 152/415; 152/343.1; 73/146

(58) Field of Classification Search
USPC ..................... 701/31, 36, 31.9; 73/146, 146.2; 303/148, 149; 340/426.33; 156/64; 152/415, 343.1
See application file for complete search history.

(56) References Cited

U.S. PATENT DOCUMENTS

| | | | | | |
|---|---|---|---|---|---|
| 5,109,213 | A | * | 4/1992 | Williams | 340/447 |
| 5,562,787 | A | * | 10/1996 | Koch et al. | 156/64 |
| 5,827,957 | A | * | 10/1998 | Wehinger | 73/146.3 |

(Continued)

FOREIGN PATENT DOCUMENTS

| | | |
|---|---|---|
| DE | 196 11 364 A1 | 10/1997 |
| EP | 1010551 A2 * | 6/2000 |

(Continued)

OTHER PUBLICATIONS

Extended European Search Report, dated Dec. 17, 2013, issued in corresponding European Patent Application No. 13182389.0.

(Continued)

*Primary Examiner* — Tuan C. To
(74) *Attorney, Agent, or Firm* — Sughrue Mion, PLLC

(57) ABSTRACT

A system for predicting tire casing life remaining for a casing in a tire, the system including: a tire condition measurement unit that measures one characteristic value including tire internal pressure information indicating at least one of a tire condition and a vehicle running condition; a temperature history estimation unit that estimates a temperature history of at least one location in at least one casing structural member based on the characteristic value; a member physical property calculation unit that calculates at least one current physical property value of the at least one casing structural member that degrades due to tire internal air temperature based on at least the tire internal pressure information and the temperature history; and a remaining drivable distance prediction unit that predicts a drivable distance of the tire until the current physical property value reaches a physical property value limit set in advance.

5 Claims, 4 Drawing Sheets

(56) References Cited

U.S. PATENT DOCUMENTS

| | | | |
|---|---|---|---|
| 7,320,246 B2 * | 1/2008 | Schick et al. | 73/146 |
| 7,472,587 B1 * | 1/2009 | Loehndorf et al. | 73/146 |
| 7,546,764 B2 * | 6/2009 | Morinaga et al. | 73/146 |
| 7,825,781 B2 * | 11/2010 | Matsumura | 340/426.33 |
| 7,827,858 B2 * | 11/2010 | Spetler | 73/146 |
| 7,873,449 B2 * | 1/2011 | Bujak et al. | 701/33.7 |
| 8,065,067 B2 * | 11/2011 | Svendenius et al. | 701/80 |
| 8,087,301 B2 * | 1/2012 | Hammerschmidt et al. | 73/800 |
| 2003/0058118 A1 * | 3/2003 | Wilson | 340/679 |
| 2003/0140687 A1 | 7/2003 | Hottebart et al. | |
| 2007/0279203 A1 | 12/2007 | Thomas et al. | |
| 2008/0115573 A1 * | 5/2008 | Abe et al. | 73/146.3 |
| 2009/0192667 A1 * | 7/2009 | Burreson et al. | 701/31 |
| 2009/0277262 A1 * | 11/2009 | Rensel et al. | 73/146 |
| 2010/0191495 A1 * | 7/2010 | Drevo et al. | 702/98 |
| 2012/0010776 A1 * | 1/2012 | Paturle | 701/31.5 |
| 2012/0111470 A1 * | 5/2012 | Scarpitti et al. | 152/548 |
| 2013/0146201 A1 * | 6/2013 | Thomas et al. | 152/540 |
| 2013/0160914 A1 * | 6/2013 | Oba | 152/526 |
| 2013/0340907 A1 * | 12/2013 | Pingenat et al. | 152/209.18 |

FOREIGN PATENT DOCUMENTS

| | | | |
|---|---|---|---|
| EP | 1010551 B1 * | 3/2006 | |
| JP | 2011-99018 A | 5/2011 | |
| JP | 2011-207398 A | 10/2011 | |
| JP | 2012-71678 A | 4/2012 | |
| JP | 2012-96762 A | 5/2012 | |
| JP | 2012-116417 A | 6/2012 | |

OTHER PUBLICATIONS

Notification of Reasons for Refusal issued in JP 2012-193142, dated Feb. 19, 2013.

Notification of Reasons for Refusal issued in JP 2012-193142, dated May 28, 2013.

* cited by examiner

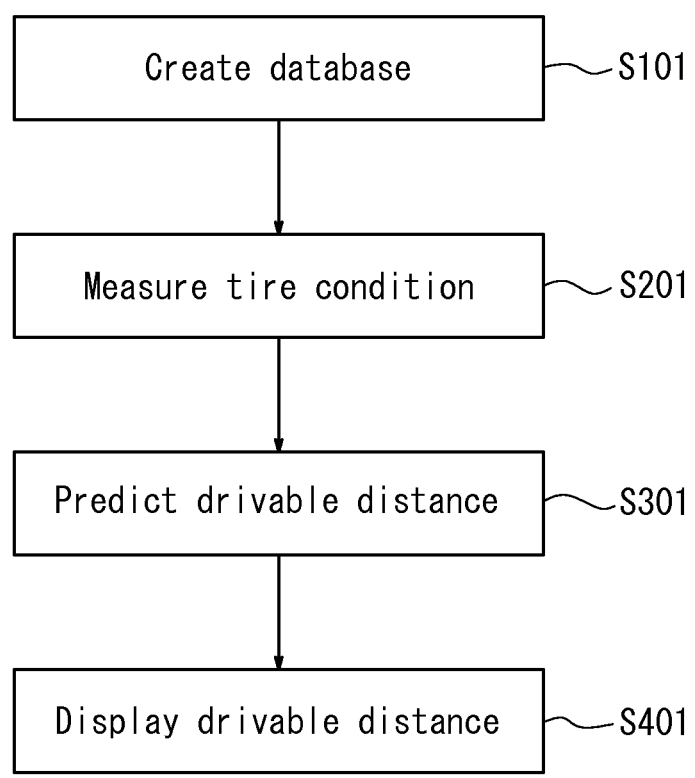

SYSTEM FOR PREDICTING TIRE CASING LIFE

CROSS REFERENCE TO RELATED APPLICATION

This application is based on an application No. 2012-193142 filed in Japan on Sep. 3, 2012, the contents of which are hereby incorporated by reference.

TECHNICAL FIELD

The present invention relates to a system for predicting tire casing life remaining for a casing in a tire provided with tread rubber and with the casing, the casing positioned inwards from the tread rubber in the tire radial direction and including at least a carcass ply.

BACKGROUND ART

A retreaded tire that is manufactured by first attaching vulcanized tread rubber or unvulcanized tread material to a tire casing and then bonding by vulcanization has been proposed for a tire casing that has been used for a certain period of time and can be used repeatedly (for example, see JP2012-096762A (PTL 1)). By using such a retreaded tire, the casing can be used for an extended period of time, and the cost to the tire user can be effectively reduced.

CITATION LIST

Patent Literature

PTL 1: JP2012-096762A

SUMMARY OF INVENTION

The casing life of a retreaded tire varies greatly depending on the conditions of use of the tire (for example, the driving conditions of the vehicle on which the tire is mounted). Furthermore, it is difficult to ascertain the condition of the casing by inspection or the like. Therefore, predicting the remaining life of the tire casing in a retreaded tire is difficult. The user of the retreaded tire is thus unable to select a tread rubber appropriately in accordance with the remaining life of the casing, and even if the replaced tread rubber is still usable, the casing might reach the end of its life first, causing the tread rubber to go to waste. The present invention has been conceived in light of the above problems and provides a system for predicting the remaining life of the tire casing.

A system according to the present invention for predicting tire casing life remaining for a casing in a tire provided with tread rubber and with the casing, the casing positioned inwards from the tread rubber in a tire radial direction and including at least a carcass ply, includes: a tire condition measurement unit configured to measure at least one characteristic value including tire internal pressure information indicating at least one of a tire condition and a vehicle running condition; a temperature history estimation unit configured to estimate a temperature history of at least one location in at least one casing structural member based on the characteristic value measured by the tire condition measurement unit; a member physical property calculation unit configured to calculate at least one current physical property value of the at least one casing structural member that degrades due to tire internal air temperature based on at least the tire internal pressure information and the temperature history for the at least one casing structural member estimated by the temperature history estimation unit and on physical property value information, acquired in advance by testing and stored in a database, including tire internal pressure, temperature history information for the at least one casing structural member, and a physical property value of the at least one casing structural member; and a remaining drivable distance prediction unit configured to predict a drivable distance of the tire until the current physical property value calculated by the member physical property calculation unit reaches a physical property value limit, set in advance, based on a difference between the current physical property value and the physical property value limit. According to this system for predicting tire casing life, the remaining life of the tire casing in a retreaded tire or the like can be predicted.

The "remaining tire casing life" in the present description and in the claims refers to the drivable distance of the tire from the time at which the remaining tire casing life is being predicted (hereinafter "the present") until the tire casing fails. The "characteristic value indicating at least one of a tire condition and a vehicle running condition" refers to a characteristic value for the temperature inside the tire or on the tire surface; the tire internal pressure; speed, driving distance, or position of the vehicle; engine speed; idling time; conditions of sudden acceleration/deceleration; and the like. The "casing structural member" refers to a structural member such as a belt, a bead, a carcass, or the like, and a "physical property value of a casing structural member" refers to a physical property value of each structural member related to failure of the casing. Furthermore, the "temperature history" does not necessarily indicate the history of temperature for every time period from the past until the present (continual change in temperature over time), but rather indicates that the temperature is not measured only at one point in time. For example, the temperature history may be the temperature of at least a plurality of points in time from the past until the present. Additionally, the "physical property value limit" refers to the physical property value of the casing structural member at the time at which the system for predicting tire casing life according to the present invention determines that the casing has reached the end of its life. For example, the physical property value limit may be the physical property value of the casing structural member at the point at which the tire casing fails and may additionally include a certain safety margin.

Another system according to the present invention for predicting tire casing life remaining for a casing in a tire provided with tread rubber and with the casing, the casing positioned inwards from the tread rubber in a tire radial direction and including at least a carcass ply, includes: a tire condition measurement unit configured to measure at least tire internal pressure information and temperature history of tire internal air temperature at one or more locations indicating at least one of a tire condition and a vehicle running condition; a member physical property calculation unit configured to calculate at least one current physical property value of at least one casing structural member that degrades due to tire internal air temperature based on at least the tire internal pressure information and the temperature history of tire internal air temperature measured by the tire condition measurement unit and on physical property value information, acquired in advance by testing and stored in a database, including tire internal pressure, temperature history information of tire internal air temperature, and a physical property value of at least one casing structural member; and a remaining drivable distance prediction unit configured to predict a drivable distance of the tire until the current physical property value calculated by the member physical property calculation unit reaches a physical property value limit, set in advance, based on a difference between the current physical property value and the physical property value limit. According to this system for predicting tire casing life, the remaining life of the tire casing in a retreaded tire or the like can be predicted accurately.

In the system for predicting tire casing life, the tire internal pressure information preferably includes at least tire internal pressure application time indicating an amount of time internal pressure is applied to the tire, and the member physical property calculation unit preferably calculates the at least one current physical property value of the at least one casing structural member based on the tire internal pressure information and on the temperature history. In this case, the remaining life of the tire casing can be predicted more accurately by measuring the tire internal pressure application time directly and calculating the degradation of the casing structural member.

The system for predicting tire casing life preferably further includes a drivable distance adjustment unit configured to adjust the drivable distance based on tire usage condition information. In this case, the remaining life of the tire casing can be predicted more accurately by adjusting the drivable distance in accordance with a variety of conditions under which the tire is used. For example, for a curve, such as in FIG. 3, that indicates the relationship between the tire driving distance and the member degradation index of the belt coating rubber in the tire when a predetermined amount of heat is continually applied, the drivable distance predicted by the curve is adjusted by changing the slope of the curve in accordance with the tire usage condition information. The "tire usage condition information" in the present description and in the claims refers to information indicating usage conditions of the tire mounted on the vehicle. For example, such information is the type of vehicle, the mounting location of the tire (front/rear wheel, left/right, and the like), the movable load of the vehicle, and conditions of the road on which the vehicle is driven, as well as the average driving speed and driving time of the vehicle which can be calculated by the tire condition measurement unit or the like.

In the system for predicting tire casing life, the tire condition measurement unit preferably measures at least one characteristic value consecutively, and the temperature history estimation unit preferably estimates the temperature history consecutively based on the at least one characteristic value consecutively measured by the tire condition measurement unit. In this case, the physical property value can be more accurately calculated by estimating the temperature history consecutively.

According to the system for predicting tire casing life of the present invention, the remaining life of the tire casing can be predicted.

BRIEF DESCRIPTION OF DRAWINGS

The present invention will be further described below with reference to the accompanying drawings, wherein:

FIG. 4 is a flowchart of operations when the user predicts the remaining life of the tire casing.

DESCRIPTION OF EMBODIMENTS

With reference to the drawings, the following describes an embodiment of the present invention.

System Structure

Figure 1:
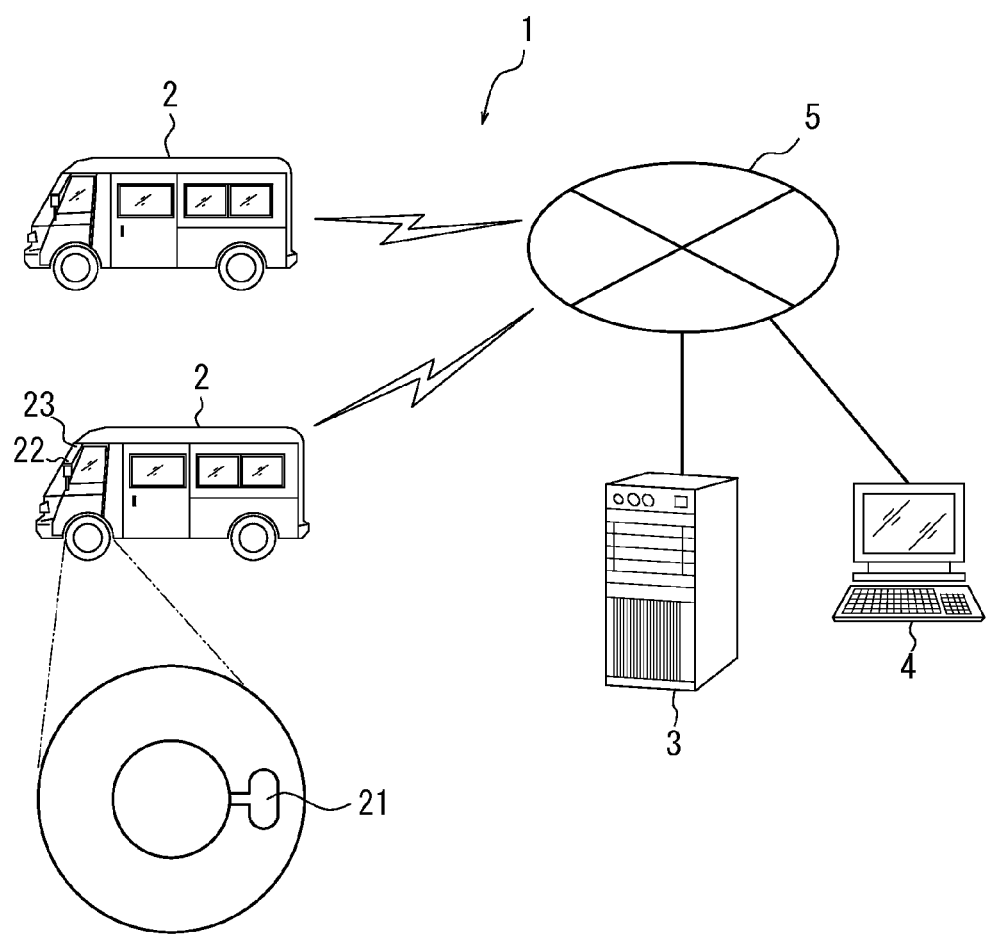
FIG. 1 illustrates a system for predicting tire casing life according to an embodiment of the present invention.

FIG. 1 illustrates the structure of a system for predicting tire casing life according to an embodiment of the present invention. A system 1 for predicting remaining tire casing life is a suitable system for predicting the remaining life of a casing in a tire, such as a retreaded tire, provided with tread rubber and with the casing, the casing positioned inwards from the tread rubber in a tire radial direction and including at least a carcass ply. Note that in the description of the system for predicting tire casing life in the present embodiment, the "user" refers to the person who operates a terminal to confirm the remaining life of the tire casing, such as a driver, transportation company, retreader, or tire vendor. The system 1 for predicting remaining tire casing life is formed by a plurality of vehicles 2, a server 3, and at least one terminal 4. The server 3 is connected to and can communicate with each of the vehicles 2 and terminal 4 via a network 5. The vehicles 2 transmit each characteristic value described below to the server 3. Examples of the network connecting the vehicles 2 and the server 3 include a radio link, a satellite channel, and the like. Based on each characteristic value received from the vehicles 2, the server 3 predicts the remaining life of the tire casing and causes the terminal 4 to display the result. The terminal 4 receives and displays the remaining life of the tire casing predicted by the server 3. As examples of the terminal 4, a variety of devices can be used, such as a PC, PDA, cellular phone, and the like. The server 3 and the terminal 4 may also be integrated. The interface between the server 3 and the terminal 4 may, for example, be achieved by establishing a Web server on the server 3, providing the terminal 4 with a Web browser, and communicating via HTTP or HTTPS.

Vehicle Structure

Figure 2:
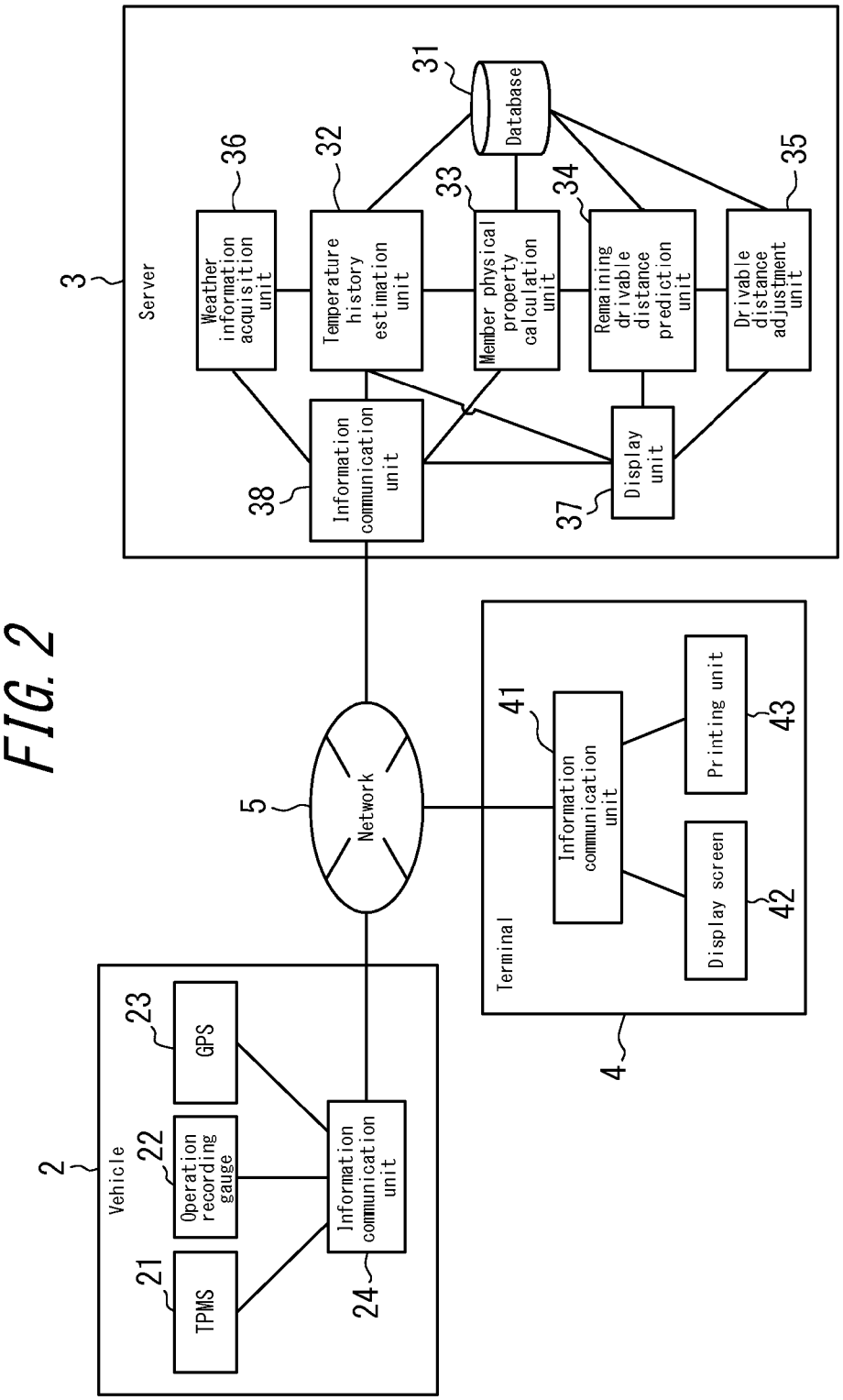
FIG. 2 is a functional block diagram illustrating the control structure of the system in FIG. 1.

The vehicle 2 measures at least one characteristic value including tire internal pressure information indicating a tire condition, a vehicle running condition, or both, and transmits each measured characteristic value to the server 3. As illustrated in FIGS. 1 and 2, each vehicle 2 includes a tire condition measurement unit and an information communication unit 24. The tire condition measurement unit includes a TPMS 21, an operation recording gauge 22, a GPS 23, and the like. These devices are merely examples, and the vehicle may be provided with other devices serving as the tire condition measurement unit. The TPMS 21 is attached to a wheel or the like on the vehicle 2 and measures the internal pressure information and temperature information for the tire, the tire internal pressure application time, and the like. The information measured by the TPMS 21 is transmitted to the information communication unit 24 of the vehicle 2 by radio once per minute, for example. The operation recording gauge 22 measures the driving distance/speed, engine speed, idling time, vehicle acceleration, and the like for the vehicle 2. The GPS 23 measures the position of the vehicle 2. These pieces of information as well are transmitted to the information communication unit 24 regularly. The information communication unit 24 of the vehicle 2 communicates with the server 3 via the network 5.

Server Structure

As illustrated in FIG. 2, the server 3 includes a database 31, a temperature history estimation unit 32, a member physical property calculation unit 33, a remaining drivable distance prediction unit 34, a drivable distance adjustment unit 35, a weather information acquisition unit 36, a display unit 37, and an information communication unit 38. The database 31 stores various information necessary for predicting the remaining life of the tire casing based on each characteristic value measured by the vehicle 2. The information stored in the database 31 is described below. The temperature history estimation unit 32 estimates the temperature history of at least one location in the tire casing based on each characteristic value measured by the vehicle 2 and, as necessary, the information stored in the database 31. The member physical property calculation unit 33 calculates the current physical property value of a casing structural member that can degrade due to the tire internal air temperature. The remaining drivable distance prediction unit 34 predicts the drivable distance of the tire until the physical property value of the casing structural member reaches a physical property value limit set in advance. The drivable distance adjustment unit 35 adjusts the drivable distance of the tire based on tire usage condition information. The weather information acquisition unit 36 acquires weather information such as the outside temperature, humidity, wind speed, and the like. The weather information acquisition unit 36 can receive weather information provided by a distributor and can also acquire weather information directly with a sensor provided in the weather information acquisition unit 36. The display unit 37 causes the terminal 4 to display the drivable distance predicted by the remaining drivable distance prediction unit 34. The member physical property calculation unit 33 can also cause the terminal 4 to display the calculated physical property value. The information communication unit 38 of the server 3 communicates with the vehicles 2 and the terminal 4 via the Internet.

Database Structure

The database 31 stores a variety of information necessary for estimating the temperature history of at least one location in the tire casing based on each characteristic value measured by the tire condition measurement unit. The database 31 also stores a variety of information necessary for calculating the at least one current physical property value of at least one casing structural member that can degrade due to the tire internal air temperature. The database 31 preferably stores the above information for each of a variety of tires. Furthermore, even if the acceleration of the vehicle is constant, the change in tire internal air temperature increases as the load on the vehicle grows larger. The database 31 can store information indicating the change in tire internal air temperature for a variety of loads. The temperature of the tire is not uniform, however, but rather varies by location on the tire. After measuring or estimating the tire internal air temperature with a TPMS or the like, the temperature of the core failure part is estimated based on the relationship between the tire internal air temperature and the temperature of the core failure part. It is thus possible to calculate the temperature of the core failure part, which is difficult to measure directly but which greatly affects failure of the tire casing. The term "core failure part" refers to a part that suffers great deformation or heat degradation, such as a belt end or ply end, and that can become the initial core failure in a tire. The database 31 can also store information indicating the change in temperature of the core failure part, for example, of the tire when mounted on each of the steering wheel, the drive wheel, and the idler wheel of the vehicle 2, and indicating the change in tire internal air temperature when the tire is mounted on the each of the front wheels and rear wheels of the vehicle 2 (i.e. the change in tire internal air temperature due to the mounting location of the tire). Additionally, the database can store information indicating the change in tire internal air temperature for different tire sizes or outside temperatures.

Figure 3:
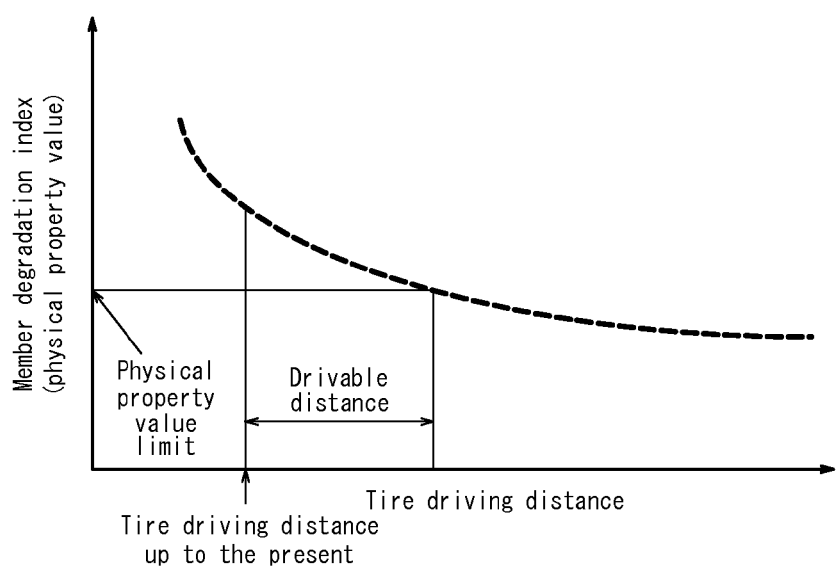
FIG. 3 illustrates the relationship between tire driving distance and the member degradation index of the belt coating rubber.

Various Types of Information for Estimating the Current Physical Property Value of the Casing Structural Member FIG. 3 illustrates the relationship between tire driving distance and the member degradation index of the belt coating rubber. In general, a casing structural member degrades due to the oxygen in the tire and to the tire driving distance. Furthermore, the degree of degradation at a certain point in time can be expressed by a physical property value, such as the member degradation index or the like at that point in time. Since the degree of degradation is greatly affected by heat, a variety of information indicating changes in physical property values when a casing structural member is continually exposed to different amounts of heat (when the casing structural member is maintained at a variety of temperatures) is preferably acquired in advance by testing and stored in the database 31. Such information for calculating the current physical property value of the casing structural member (hereinafter referred to as "physical property value information") is stored in the database 31. The system for predicting tire casing life according to the present invention can predict the remaining life of the tire casing by calculating the current physical property value of the casing structural member based on the physical property value information. Note that the degree of degradation of the casing structural member is also affected by the magnitude of the tire internal pressure and by the presence or absence of oxygen in the tire. Therefore, physical property value information related to different tire internal pressures, to the presence or absence of oxygen in the tire, and the like may also be stored in the database 31 and used to predict the remaining life of the tire casing.

Physical Property Value Limit

Before predicting the remaining life of the tire casing, a physical property value limit for the casing structural member is set in the database 31. As described above, this physical property value limit can be set to the physical property value at the point at which the tire casing fails, and a certain safety margin may be added to this physical property value. The physical property value limit may, for example, be calculated by testing. Note that storing information for adjusting the drivable distance based on the below-described tire usage condition information in the database 31 is preferable since doing so allows for more accurate prediction of the remaining life of a variety of tire casings.

Tire Usage Condition Information

The database 31 can store tire usage condition information. As described above, the tire usage condition information refers to information indicating usage conditions of the tire mounted on the vehicle. For example, such information includes the type of vehicle, the mounting location of the tire (front/rear wheel, left/right, and the like), the movable load of the vehicle, and conditions of the road on which the vehicle is driven, as well as the average driving speed and driving time of the vehicle which can be calculated by the tire condition measurement unit or the like. This tire usage condition information is input by the driver, the mechanic, or the like of the vehicle 2.

Terminal Structure

As illustrated in FIG. 2, the terminal 4 includes an information communication unit 41, a display screen 42, and a printing unit 43. The information communication unit 41 has the function of sending and receiving information to and from the server 3 via the network 5. The information communication unit may, for example, use a Web browser that can be connected to the Internet. The remaining drivable distance predicted by the server 3 is displayed on the display screen 42. The printing unit 43 can print information such as the information displayed on the display screen 42.

Description of System Function

With reference to FIGS. 1 and 2, the following describes the system function to predict the remaining life of a tire casing. Note that before performing the following function, it is assumed that the tire condition measurement unit is attached to the vehicle 2 and that the above-described variety of information and the like is stored in the database 31 of the server 3.

Measurement of Characteristic Value (1) The tire condition measurement unit measures at least one characteristic value indicating a tire condition, a vehicle running condition, or both. For example, the TPMS 21 measures the tire internal pressure and the tire internal air temperature, the operation recording gauge 22 measures the driving distance/speed, engine speed, idling time, and vehicle acceleration of the vehicle 2, and the GPS 23 measures the position of the vehicle 2.

(2) The information communication unit 24 of the vehicle 2 transmits each characteristic value measured by the TPMS 21, operation recording gauge 22, GPS 23, and the like of the tire condition measurement unit to the server 3. Note that along with each characteristic value, the information communication unit 24 can also transmit the time at which each characteristic value was measured, information identifying the vehicle 2, information identifying the tire measured by the tire condition measurement unit, and the like.

Estimation of Temperature History in Tire Casing

Once the information communication unit 38 of the server 3 receives each characteristic value, the temperature history estimation unit 32 calculates the tire internal air temperature and estimates the temperature history in the tire casing based on each received characteristic value and, for example, on information stored in the database 31 indicating the relationship between the speed or acceleration of the vehicle and the tire internal air temperature. The following provides an example of detailed steps for this estimation.

(1) First, the acceleration of the vehicle 2 is calculated based on the speed of the vehicle 2 measured by the operation recording gauge 22. As necessary, position information on the vehicle measured by the GPS 23 is used. Based on the calculated speed and acceleration of the vehicle 2 and on the information stored in the database 31, the tire internal air temperature is estimated. Note that only in the case when the TPMS 21 cannot be used, the operation recording gauge 22 can be used to estimate the speed history of the vehicle and calculate the tire internal air temperature.

(2) Based on the tire internal air temperature measured by the TPMS 21 or the like and on the information stored in the database 31 indicating the relationship with the temperature at various locations of the tire, the temperature history at various locations of the tire casing can be estimated. For example, the TPMS 21 can measure the tire internal air temperature, and using the relationship between the tire internal air temperature and the temperature of the core failure part, the temperature history of the core failure part can be estimated. The weather information acquisition unit 36 acquires weather information such as the outside temperature, humidity, and the like and can estimate the temperature history based on the weather information. Furthermore, when the tire usage condition information is stored in the database 31, the tire usage condition information can be used for estimation of the temperature history. For example, from the movable load of the vehicle, the load on the tire can be calculated, and the tire internal air temperature can then be estimated based on the relationship between the tire internal air temperature and the speed and acceleration of the vehicle for the calculated load, thereby allowing for estimation of the temperature history.

(3) Note that when the TPMS 21 is attached only to a portion of the tires of the vehicle 2, information stored in the database 31 indicating the change in the tire internal air temperature due to the mounting location of the tire can be used to estimate the tire internal air temperature where the TPMS is not attached.

(4) As necessary, the information communication unit 38 of the server 3 can create a consecutive temperature history (temperature profile) of at least one structural member of the casing (here, the core failure part) by consecutively receiving characteristic values measured by the tire condition measurement unit of the vehicle and estimating the temperature between each point of reception.

Estimation of the Current Physical Property Value of the Casing Structural Member (1) Based on the temperature history (including the temperature profile) of at least one structural member of the casing (such as the core failure part) estimated by the temperature history estimation unit 32 of the server 3, the heat applied to the at least one structural member of the casing (the temperature of the structural member) is calculated.

(2) With reference to the physical property value information, as in FIG. 3, stored in the database 31, the current physical property value of the casing structural member after driving a predetermined tire driving distance can be calculated based on the heat applied to the casing structural member, the tire internal pressure information received from the vehicle 2, and the tire driving distance measured or calculated based on other characteristic values. The tire internal pressure information preferably includes the tire internal pressure application time, i.e. the tire internal pressure application time is preferably directly measured so as to allow for more accurate calculation of the current physical property value of the casing structural member. Alternatively, the tire internal pressure application time may be calculated by, for example, consecutively acquiring the tire internal pressure information. The current physical property value of the casing structural member is preferably adjusted based on the magnitude of the tire internal pressure and the presence or absence of oxygen in the tire.

Prediction of Drivable Distance (1) The physical property value limit of the casing structural member is stored in the database 31.

(2) Based on the physical property value of the casing structural member calculated by the member physical property calculation unit 33, the difference is calculated between the tire driving distance up to the present and the tire driving distance until the physical property value such as the member degradation index reaches the physical property value limit set in advance (i.e. the drivable distance is calculated), for example as shown in FIG. 3. As necessary, the drivable distance adjustment unit 35 can adjust the drivable distance based on the tire usage condition information. For example, for a curve, such as in FIG. 3, that indicates the relationship between the tire driving distance and the member degradation index of the belt coating rubber in the tire, the drivable distance predicted by the curve is adjusted by changing the slope of the curve in accordance with the tire usage condition information.

Flow of Operations when Predicting Remaining Life of Tire Casing

With reference to the flowchart in FIG. 4, the following explains the flow of operations when the user predicts the remaining life of the tire casing. In step S101, weighting, statistical processing, and the like are performed on data resulting from a drum test, or a vehicle driving test on a circuit, carried out by the tire developer or the like, and/or on data measured by a TPMS or the like attached to the vehicle by the user. A variety of information necessary for estimating the temperature history of at least one location in the tire casing is thus acquired, such as the change in tire internal air temperature when the vehicle 2 is accelerated or decelerated, the relationship between the tire internal air temperature and the temperature of the core failure part, and the relationship between the tire driving distance and the member degradation index of the belt coating rubber in the tire as illustrated in FIG. 3. A variety of information necessary for calculating at least one current physical property value of at least one casing structural member that can degrade due to the tire internal air temperature is also acquired. The database 31 is created from the above information. In step S201, the tire condition measurement unit including the TPMS 21, operation recording gauge 22, GPS 23, and the like is attached to at least one vehicle 2, and at least one characteristic value including the tire internal pressure information is measured. The information communication unit 24 transmits each measured characteristic value to the server 3. Note that instead of transmitting each characteristic value, the tire condition measurement unit can also store each measured characteristic value in a storage medium and cause the server 3 to read from the storage medium. In step S301, the server 3 estimates the temperature history of at least one structural member of the tire casing based on each characteristic value received from at least one vehicle, calculates the current physical property value of a casing structural member that can degrade due to the tire internal air temperature based on the temperature history and on the tire internal pressure information received from each vehicle 2, and predicts the remaining drivable distance until the physical property value reaches the physical property value limit. Note that when the temperature history at one or more locations in the casing is directly measured in step S201, the current physical property value of a casing structural member that can degrade due to the tire internal air temperature can be calculated based on the measured temperature history and on the tire internal pressure information received from each vehicle 2. In step S401, the user operates the terminal 4 to cause the drivable distance predicted by the server 3 to be displayed on the display screen of the terminal 4. After the user confirms the drivable distance (i.e. the remaining life of the tire casing), the user can, for example, select a tread rubber to attach to the casing such that the life of the tread rubber, calculated in advance, nearly matches the predicted remaining life of the tire casing. When the predicted remaining life of the tire casing is short, the user can also choose not to retread the tire. By thus using the remaining life of the tire casing as predicted by the system for predicting tire casing life, the user can reduce costs and lessen the burden on the environment, while also predicting failure of the tire casing in advance.

INDUSTRIAL APPLICABILITY

While the flow of operations for predicting the casing life of a retreaded tire has been described, the system for predicting tire casing life according to the present invention can also be used for tires other than retreaded tires. For example, the remaining life of a passenger vehicle tire can be predicted and indicated to the driver. The above system is also useful during tire research and development.

REFERENCE SIGNS LIST

1: System for predicting tire casing life
2: Vehicle
3: Server
4: Terminal
5: Network
21: TPMS (tire condition measurement unit)
22: Operation recording gauge (tire condition measurement unit)
23: GPS (tire condition measurement unit)
24: Information communication unit
31: Database
32: Temperature history estimation unit
33: Member physical property calculation unit
34: Remaining drivable distance prediction unit
35: Drivable distance adjustment unit
36: Weather information acquisition unit
37: Display unit
38: Information communication unit
41: Information communication unit
42: Display screen
43: Printing unit

The invention claimed is:

1. A system for predicting tire casing life remaining for a casing in a tire provided with tread rubber and with the casing, the casing positioned inwards from the tread rubber in a tire radial direction and including at least a carcass ply, the system comprising:
a tire condition measurement unit configured to measure at least one characteristic value including tire internal pressure information indicating at least one of a tire condition and a vehicle running condition;
a temperature history estimation unit configured to estimate a temperature history of at least one location in at least one casing structural member based on the characteristic value measured by the tire condition measurement unit;
a member physical property calculation unit configured to calculate at least one current physical property value of the at least one casing structural member that degrades due to tire internal air temperature based on at least the tire internal pressure information and the temperature history for the at least one casing structural member estimated by the temperature history estimation unit and on physical property value information, acquired in advance by testing and stored in a database, including tire internal pressure, temperature history information for the at least one casing structural member, and a physical property value of the at least one casing structural member; and
a remaining drivable distance prediction unit configured to predict a drivable distance of the tire until the current physical property value calculated by the member physical property calculation unit reaches a physical property value limit, set in advance, based on a difference between the current physical property value and the physical property value limit.

2. A system for predicting tire casing life remaining for a casing in a tire provided with tread rubber and with the casing, the casing positioned inwards from the tread rubber in a tire radial direction and including at least a carcass ply, the system comprising:
a tire condition measurement unit configured to measure at least tire internal pressure information and temperature history of tire internal air temperature at one or more locations indicating at least one of a tire condition and a vehicle running condition;
a member physical property calculation unit configured to calculate at least one current physical property value of at least one casing structural member that degrades due to tire internal air temperature based on at least the tire internal pressure information and the temperature history of tire internal air temperature measured by the tire condition measurement unit and on physical property value information, acquired in advance by testing and stored in a database, including tire internal pressure, temperature history information of tire internal air temperature, and a physical property value of at least one casing structural member; and a remaining drivable distance prediction unit configured to predict a drivable distance of the tire until the current physical property value calculated by the member physical property calculation unit reaches a physical property value limit, set in advance, based on a difference between the current physical property value and the physical property value limit.

3. The system for predicting tire casing life according to claim 1, wherein the tire internal pressure information includes at least tire internal pressure application time indicating an amount of time internal pressure is applied to the tire, and the member physical property calculation unit calculates the at least one current physical property value of the at least one casing structural member based on the tire internal pressure information and on the temperature history.

4. The system for predicting tire casing life according to claim 1, further comprising a drivable distance adjustment unit configured to adjust the drivable distance based on tire usage condition information.

5. The system for predicting tire casing life according to claim 1, wherein the tire condition measurement unit consecutively measures at least one characteristic value, and the temperature history estimation unit estimates the temperature history consecutively based on the at least one characteristic value consecutively measured by the tire condition measurement unit.

* * * * *